United States Patent [19]

Nelmark

[11] 3,947,009
[45] Mar. 30, 1976

[54] DRILL SHOCK ABSORBER

[75] Inventor: Jack D. Nelmark, New Berlin, Wis.

[73] Assignee: Bucyrus-Erie Company, South Milwaukee, Wis.

[22] Filed: Dec. 23, 1974

[21] Appl. No.: 535,736

[52] U.S. Cl. .................................... 267/137; 64/13
[51] Int. Cl.² ........................................ F16F 15/10
[58] Field of Search ........ 267/137, 136, 119; 64/11, 64/13, 23; 175/321

[56] References Cited
UNITED STATES PATENTS

| | | | |
|---|---|---|---|
| 3,746,330 | 8/1973 | Taciuk | 267/137 |
| 3,775,998 | 12/1973 | Century et al. | 64/13 |

*Primary Examiner*—James B. Marbert
*Attorney, Agent, or Firm*—Quarles & Brady

[57] ABSTRACT

A shock absorber for dampening longitudinal and torsional vibrations in a drill is disposed intermediate a hollow drive shaft member and a hollow driven shaft member of a drill string. Resilient means are sandwiched between a drive plate attached to the drive shaft member and a driven plate secured to the driven shaft member. Additional resilient means are sandwiched between the driven plate and a pressure plate which surrounds the driven shaft member at a position beneath the driven plate. Pins project from the driven plate through the resilient means into vertically spaced openings formed in the drive plate and the pressure plate. Fastening means extend between the drive plate and the pressure plate to precompress the resilient means, and a shielding sleeve is connected to the drive shaft member for sliding movement within the driven shaft member. This sleeve forms a closed passage between the hollow shaft members for conveying compressed air, and for shielding the resilient means from dynamic air pressures.

5 Claims, 3 Drawing Figures

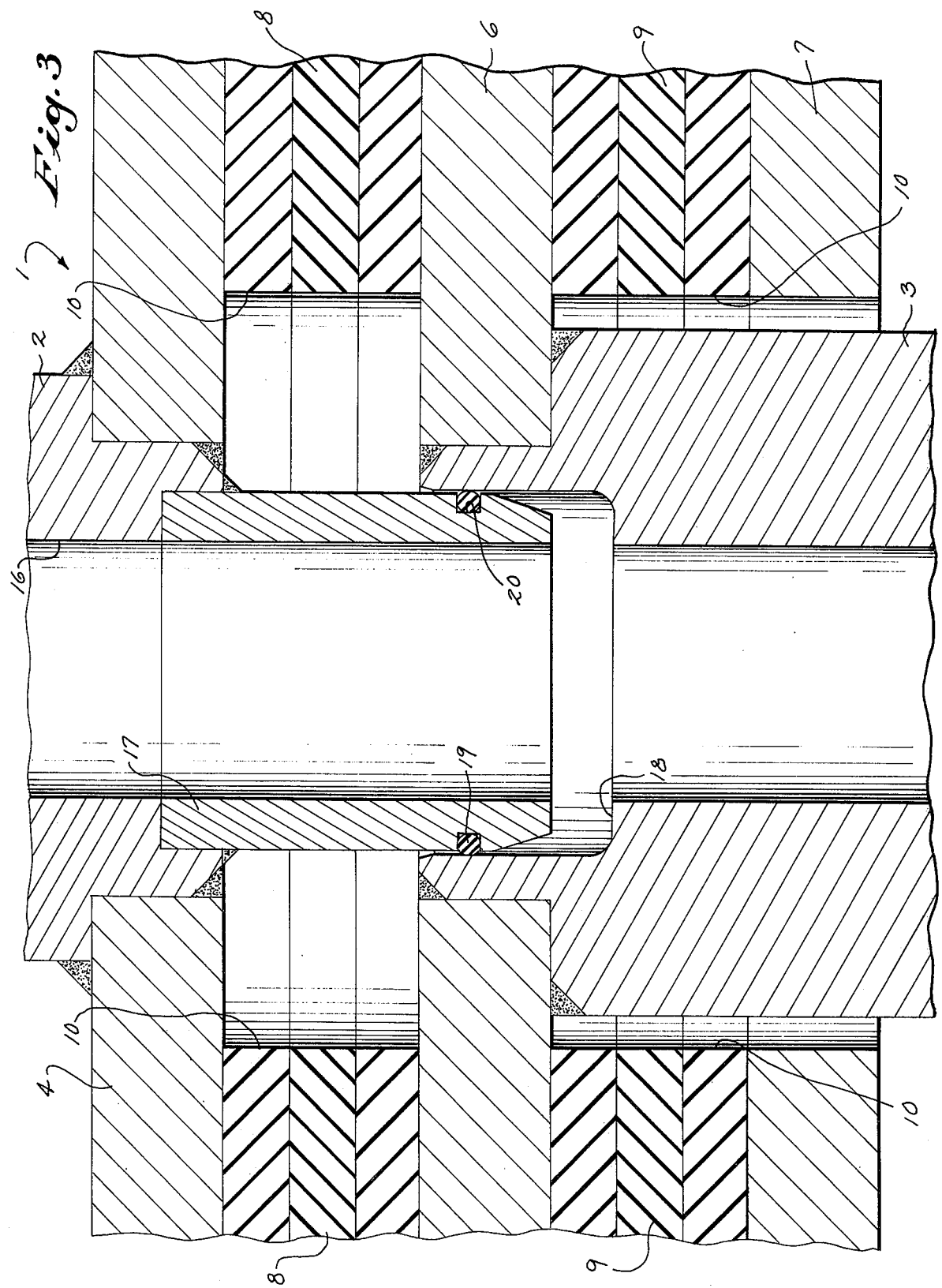

DRILL SHOCK ABSORBER

BACKGROUND OF THE INVENTION

The invention relates to a shock absorber for drilling apparatus, and more particularly to an improved shock absorber located in the drill string of a rotary drill.

In conventional blast hole drilling, a drill string formed by several interconnected sections of hollow drill shafts is both longitudinally and rotationally driven to force a drill bit into the earth. As variable subterraneous formations are encountered, the rotation of the drill string and the axial pressure applied to the drill bit generate severe vibrations or chatter which are transmitted through the drill string to the drilling machine. Such vibrations, if not dampened, may contribute significantly to fatigue failures, as exhibited by buckling of the drill string and excessive wear of machine welds, drill bits and masts. In order to combat detrimental chatter and avoid damage to the drilling apparatus, it is desirable to employ a shock absorbing coupling in the drill string having resilient means for cushioning longitudinal and torsional shocks and absorbing minor alignment variations.

One shock absorbing device of this character is disclosed in U.S. Pat. No. 3,746,330, to W. Taciuk dated July 17, 1973. In that patent, a resilient joint is provided intermediate a drive shaft and a driven shaft of a tubular drill string. The device comprises a group of resilient discs sandwiched between a series of axially spaced drive, driven and pressure plates which surround drive and driven shaft members. Pin projections extend from the driven plate into the resilient discs, while fastening means extend between the drive and pressure plates for compressing the resilient discs together and into union with the pin projections and fastening means. Longitudinal drilling forces and torque are transmitted through the resilient discs, and in addition to transmitting the necessary working forces, the resilient means must perform the function of cushioning shocks and vibrations within the drill string in both longitudinal and torsional modes.

In shock absorbers of the type described above, the resilient discs between the drive and driven plates cooperate with the hollow drive and driven shaft members to complete an air passageway which extends through the center of the tubular drill string. Pressurized air is circulated downwardly through this passageway to the drill bit, and then the air returns upwardly through the space between the drill string and drill hole to carry drill cuttings upward out of the hole.

The resilient discs of these shock absorbers have displayed limited life, making the desirability of the devices questionable. The forces and peak stresses encountered should have been well within the working limits of the material of the discs. It is a discovery of the present invention that breakdown of the discs has been due largely to the pressures and heat of the transmitted air, and thus the invention is an improvement upon the shock absorber of the above cited patent.

The internal surfaces of the resilient discs have been exposed to the pressurized air being forced through the drill stem. This pressurized air being present in substantial volume often creates interior drill string temperatures approaching 250°F. It has been found that as a result of this pressure and temperature buildup, the resilient discs are susceptible to increased deterioration and subsequent material breakdown which can render the shock absorber unfit for service, and the present invention is intended to alleviate these problems.

SUMMARY OF THE INVENTION

The present invention relates to an improved drill shock absorber having a drive plate attached to a hollow drive shaft member, a driven plate secured to a hollow driven shaft member, resilient means located between the drive and driven plates, a shielding sleeve between the drive and driven shaft members to define a passageway isolated from the resilient means, and a sealing member for the shielding sleeve to form a fluid tight seal between the shielding sleeve and an associated shaft member.

The prior art shock absorber upon which the present invention improves spaces two hollow sections of a drill string by utilizing resilient means. The ends of the hollow sections cooperate with these resilient means to form a passageway for transporting pressurized fluid through the drill string to a drill hole from which drill cuttings are removed. It is desirable to retain the basic operating characteristics of this shock absorber, but to overcome the prior deficiency in which the resilient means are highly susceptible to deterioration by constant exposure to pressurized fluid circulating through the formed passageway.

The present invention uniquely solves this problem by providing a shielding sleeve disposed between and in coupled engagement with each of the spaced ends of the hollow drive and driven shaft members. The sleeve forms a duct communicating between the spaced ends of the hollow shaft members and shields the resilient means from fluid flowing through these hollow shaft members. The coupled engagement includes a resilient sealing ring interposed between the shielding sleeve and the driven shaft member to provide a flexible coupling which permits limited displacement between the hollow shaft members.

It is a general objective of the invention to provide a drill shock absorber having a shielding sleeve and sealing ring which eliminate the communication between the resilient means and pressurized fluid as previously occurred in the prior art.

Another objective is to provide a shock absorber having a shielded passageway directly between the hollow drive and driven shaft members which is utilized for transporting fluid and will not interfere with the cushioning and transmitting functions of the shock absorber.

A further objective of the invention is to provide a shock absorber for reducing metallic contact and allowing improved angular movement of a drill string.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in many different embodiments, and reference is made to the claims for interpreting the breadth of the invention.

BRIEF DESCRIPTION OF THE DRAWINGS

FIG. 3 is an enlarged longitudinal view in cross section showing the internal, central parts of the shock absorber.

DESCRIPTION OF THE PREFERRED EMBODIMENT

Figure 1:
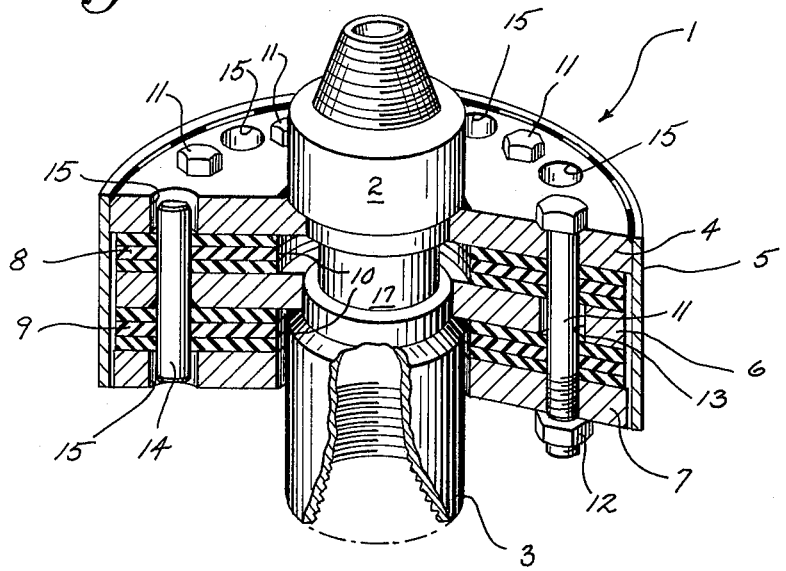
FIG. 1 is a view in perspective of a drill shock absorber embodying the present invention with parts broken away and in section to illustrate the internal structure.
Figure 2:
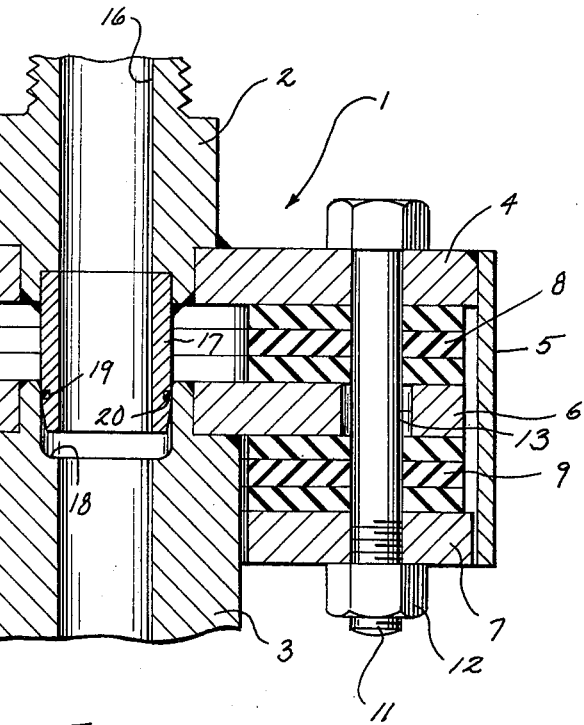
FIG. 2 is a longitudinal view in cross section through the shock absorber.

Referring to the accompanying drawings, a shock absorber, generally identified by the reference numeral 1, has a tubular drive shaft member 2 and a tubular driven shaft member 3 that are provided with threaded couplings at their ends for insertion into a drill string. The usual drill string is fitted at its lower end with a drill bit which is longitudinally and rotationally driven into the earth by power means, and severe vibrations are generated in the drilling operation which are transmitted along the drill string. The shock absorber 1 is intended to be inserted near the upper end of the string to reduce the transmission of vibrations and shock along the string.

A drive plate 4 of flat, circular configuration is welded to the stepped, lower end of the drive shaft member 2 in a position normal to the drill string axis and is coaxial therewith. A peripheral skirt 5 is secured around the circumferential edge to the plate 4 and depends therefrom to protectively house the interior elements of the shock absorber 1 from foreign materials such as dust or oil which may be present in the drilling vicinity.

In the middle of the shock absorber 1 is a flat, circular driven plate 6 that lies parallel to and is spaced beneath the drive plate 4. The driven plate 6 is welded to the stepped upper end of the driven shaft member 3, and it is of slightly smaller diameter than the drive plate 4 so as to have a clearance from the skirt 5. The drive and driven plates 4, 6 are arranged so that the drive and driven shaft members 2, 3 are in axial alignment so that their hollow centers open upon one another with a substantial space therebetween.

An annular pressure plate 7 surrounds the driven shaft member 3 with a gap therebetween, and it underlies the driven plate 6 in a floating relationship thereto. A first group of annular resilient discs 8 of rubber or the like are sandwiched between the drive plate 4 and the driven plate 6. A second group of similar annular discs 9 of resilient material are inserted between the driven plate 6 and the pressure plate 7. Each of the discs 8, 9 is provided with a central aperture 10 having a diameter slightly larger than that of the driven shaft member 3, so that there may be a relative movement of these parts without any binding between them.

A set of fastening bolts 11 arranged in a circular array extend through the drive plate 4, the first or upper set of resilient discs 8, the driven plate 6, the second or lower set of resilient discs 9 and the bottom pressure plate 7. A nut 12 is brought up tight on each bolt 11 against the underside of the pressure plate 7 to precompress the resilient discs 8, 9 to preload the shock absorber 1. The driven plate 6 has apertures 13 which pass the bolts 11 with such a clearance that metal-to-metal contact will not occur during operation. The resilient discs 8, 9, on the other hand, have smaller openings for receiving the bolts 11 such that upon compression of the discs 8, 9 they tightly contract about the bolts. The bolts also have a snug fit with the drive plate 4, so that driving torque can be effectively transmitted from the drive shaft member 2 through the drive plate 4 and bolts 11 to the resilient discs 8, 9.

A set of pins 14 are distributed about the same circle and lie midway between the fastening bolts 11. The pins 14 parallel the drill string axis and the bolts 11, and are secured tightly in the driven plate 6 with their ends extending through and beyond the first and second groups of resilient discs 8, 9. The pin ends project into openings 15 in the drive plate 4 and the pressure plate 7, so that the pins 14 are free from contact with the plates 4, 7 at all times. The pins 14 are snugly received by the resilient discs 8, 9, similarly as the bolts 11, so that torque will be effectively transmitted from the discs 8, 9 through the pins 14 to the driven plate 6 and hence the driven shaft member 3.

The shock absorber as described to this point is similar to that shown in U.S. Pat. No. 3,746,330 hereinbefore referred to, except for the protrusion of the pins 14 beyond the resilient discs 8, 9 and the provision of the clearance openings 15.

As a distinct feature, the enlarged openings 15 provide room for relative travel of the ends of the pins 14 when either of the first or second groups of resilient discs 8, 9 are compressed. The openings 15 further provide side clearance to allow the driven plate 6 a greater degree of angular displacement during conditions of misalignment between shaft members 2, 3, or when large shear forces cause twisting between parts. The enlarged openings 15 are intended to eliminate destructive metal-to-metal contact between the pins 14, the drive plate 4 and the pressure plate 7 as occurred at times in the prior art. In addition, the pins 14 extend through the entire depth of the discs 8, 9 to enhance torque transmission.

Pursuant to the invention, the shock absorber 1 provides an internal shielding for the nonmetallic, resilient members to facilitate transmission of fluid for removal of drill cuttings from the drill hole. Turning to FIG. 3, the hollow drive and driven shaft members 2 and 3 form a fluid conduit 16 along the axis of the drill string. A short, cylindrical shielding sleeve 17 forms a continuation of the conduit 16 between the spaced ends of the shaft members 2, 3. This sleeve 17 is recessed within and rigidly welded to the end of the drive shaft member 2, and the sleeve 17 projects downwardly into a seat 18 formed in the upper end of the driven shaft member 3. The sleeve 17 is in a telescoped connection with the seat 18, and there is a loose fit between the sleeve 17 and the sidewalls of the seat 18. This loose fit will accommodate axial shifting and misalignments that will occur during drilling and in the normal function of the shock absorber 1. A movable, bridging connection in the form of a duct is thereby provided by the sleeve 17 between the ends of the shaft members 2, 3, and the interior of the sleeve 17 cooperates with the conduit 16 to define a continuous passageway used for transmitting fluid such as compressed air into the drill hole for the clearing of drill cuttings.

It is a particular object of the invention to employ the shielding sleeve 17 for creating a fluid passageway which is totally isolated from the nonmetallic elements of the shock absorber 1, especially the first or upper group of resilient discs 8. To insure that the shielding sleeve 17 confines fluid transmitted through the conduit 16 there is provided a sealing ring 19 which lies in an annular groove 20 encircling the sleeve 17. The sealing ring 19 forms a fluid tight seal between the sleeve 17 and the driven shaft member 3, and separates these elements so that metal-to-metal contact will normally be prevented. In performing its sealing operation, the ring 19 is subject to heat and pressure of the fluid, and in order to reduce deterioration the sealing ring 19 is preferably formed of a silicone which will withstand extremely high temperatures up to 600°F.

As torque and longitudinal pressure are applied to the transmitting elements of the shock absorber 1, the shielding sleeve 17 moves upwardly and downwardly within the driven shaft member 3, and the sealing ring 19 slides along the vertical walls of the seat 18. To prevent the occurrence of metal-to-metal engagement, the shock absorber 1 is constructed so that the bottom of the sleeve 17 will not contact the base of the seat 18. In order to maintain the fluid tight seal between the sleeve 17 and driven shaft member 3, the shock absorber 1 is also designed such that the sealing ring 19 will not rise above the bevel on the upper end of the driven shaft member 3. The sealing ring 19 remains unitary for prolonged periods of use despite being subject to transmission forces and shocks, and coacts with the sleeve 17 to shield the upper group of discs 8 so that their dampening and transmitting characteristics will be preserved. This protection is of foremost importance in extending the lifetime of the shock absorber 1 and, in turn, the accompanying drilling equipment.

I claim:

1. In a drill shock absorber having hollow drive shaft and driven shaft members with their open ends aligned with and spaced from one another, a drive plate fixed on the end of said drive shaft member, a driven plate fixed on the end of said driven shaft member which is in spaced, faced relation to said drive plate, and annular resilient means sandwiched between said drive and driven plates with a hollow interior encircling the ends of said drive and driven shaft members, the improvement therein of:
   a shielding sleeve disposed between and in coupled engagement with each of said ends of said drive shaft and driven shaft members that forms a duct communicating between the ends of said hollow members, and shields said resilient means from fluid flow through said shaft members; and
   said coupled engagement including a resilient seal interposed between said shielding sleeve and at least one of said shaft members providing a flexible coupling permitting limited displacement between said shaft members.

2. In a drill shock absorber having hollow drive shaft and driven shaft members with their open ends aligned with and spaced from one another, a drive plate fixed on the end of said drive shaft member, a driven plate fixed on the ends of said driven shaft member which is in spaced, faced relation to said drive plate, and annular resilient means sandwiched between said drive and driven plates with a hollow interior encircling the ends of said drive and driven shaft members, the improvement therein of:
   a shielding sleeve extending through said hollow interior of said resilient means that has one end secured in one of said drive and driven shaft members and an opposite end telescoped into the other of said drive and driven shaft members with a loose fit to provide a duct communicating between the hollow shaft members that shields said resilient means from fluids flowing through said shaft members; and
   a sealing ring encircling said opposite end of said shielding sleeve to form a fluid tight seal between such opposite end and the shaft member into which it extends with said loose fit.

3. In a drill shock absorber having a first plate attached to a first hollow shaft, a second plate attached to a second hollow shaft, resilient means located between said first and second plates, said resilient means having a hollow interior, the combination therewith comprising:
   a shielding sleeve connected to said first shaft and extending through said hollow interior of said resilient means in a loose, sliding relationship between said first and second shafts, said sleeve cooperating with said first and second shafts to provide a duct communicating between said first and second hollow shafts that shields the resilient means from fluids flowing through said hollow shafts; and
   a sealing ring encircling said shielding sleeve to form a fluid tight seal between said second shaft and said shielding sleeve.

4. In a drill shock absorber having a drive plate attached to a hollow drive shaft member, a driven plate secured to a hollow driven shaft member, a pressure plate spaced from said driven plate on the side opposite said drive plate, first resilient means between said drive and driven plates, and having a hollow center portion, second resilient means between said driven plate and said washer, fastening means extending between said drive plate and said pressure plate, the combination comprising:
   a set of openings formed in said drive plate and pressure plate;
   pins connected to and extending from said driven plate into each of said first and second resilient means and into said openings;
   a shielding sleeve extending through said hollow center portion of said first resilient means and slidably disposed between said drive and driven shaft members, said sleeve cooperating with said drive and driven shaft members to define a duct shielded from said drive plate, said resilient means and said driven plate and lying in communication with the hollow drive and driven shaft members; and
   a sealing ring encircling said shielding sleeve to form a fluid tight seal between said driven shaft member and said shielding sleeve.

5. In a drill shock absorber having a drive plate attached to a hollow drive shaft member, a driven plate secured to a hollow driven shaft member, resilient means located between said drive and driven plates, said resilient means having a hollow center portion, the combination comprising:
   a shielding sleeve connected to said drive shaft member and passing through said hollow center portion of said resilient means, said sleeve being telescoped within a seat formed in said driven shaft member, said sleeve presenting a duct cooperating with said hollow drive and driven shaft members to form a passageway isolated from said drive plate, said resilient means and said driven plate, said duct being utilized for transporting fluid through the drill; and
   a sealing ring encircling said shielding sleeve to form a fluid tight seal between said driven shaft member and said shielding sleeve.

* * * * *